March 11, 1958 G. T. ALDRICH 2,826,627

DEFERRED ACTION BATTERY

Filed Oct. 26, 1954

Gerard T. Aldrich

*INVENTOR.*

*BY*

Attorney

United States Patent Office 2,826,627

Patented Mar. 11, 1958

2,826,627

DEFERRED ACTION BATTERY

Gerard T. Aldrich, Waterford, Conn., assignor, by mesne assignments, to Sanders Associates, Inc., Nashua, N. H., a corporation of Delaware Application October 26, 1954, Serial No. 464,835

6 Claims. (Cl. 136—90)

This invention relates to deferred action batteries. More particularly, the invention relates to wet cell batteries of the type frequently employed in Sonobuoy equipment.

The term "Sonobuoy" denotes in the art a listening device which is designed to be dropped from an airplane in pursuit, for example, of submarines. These devices employ saltwater as an electrolyte and are designed to be actuated upon immersion in ocean water. It is common practice in the prior art to store the batteries separately from the device until the device is ready for use. The shelf life of these batteries which employ, for example carbon-zinc electrodes, is severely limited since the electrodes are continuously exposed to air.

It is an object of the present invention to provide an improved deferred action battery, whereby the electrolyte may be readily and simply introduced into the assembly to the extent desired at the time when the battery is actually to be used.

A further object of the present invention is to provide an improved deferred action battery having an evacuated electrode chamber which is characterized by longevity of shelf life, speedy and dependable activation and simplicity of structure.

Other and further objects of the invention will be apparent from the following description of preferred embodiments, taken in connection with the accompanying drawings.

In accordance with the present invention, there is provided a deferred action battery which comprises an evacuated chamber. A plurality of electrodes are disposed in the chamber and adapted to generate current in the presence of an electrolyte and to produce gas under pressure by electrolysis. A tubular connecting means is movably mounted below and perpendicular to the bottom of the chamber and has a tapered end adjacent the chamber. A resilient bellows is affixed to the bottom of the chamber and surrounds the tapered end of the tubular means to seal off the tapered end to restrict the flow of the electrolyte only through the tube. Finally, a flange is coupled to the end of the means remote from the chamber for causing the tapered end to pierce the bottom of the chamber upon impact of the assembly with a source of electrolyte and for causing the electrolyte to flow through the tubular means into the chamber, the electrolyte being exhausted through the tube under the pressure of the electrolyte.

Figure 1:
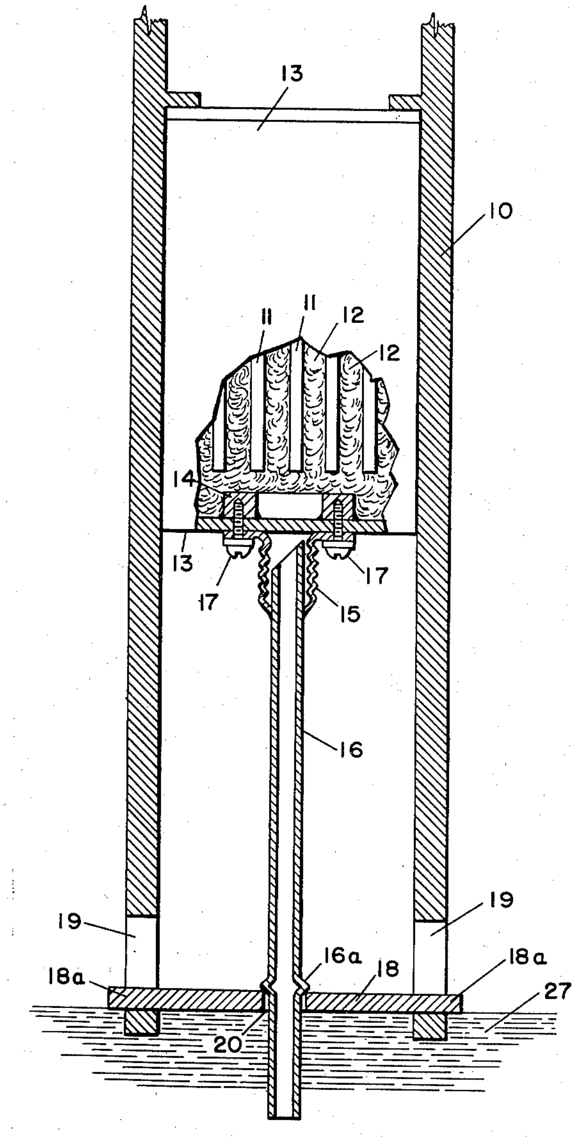
Figure 2:
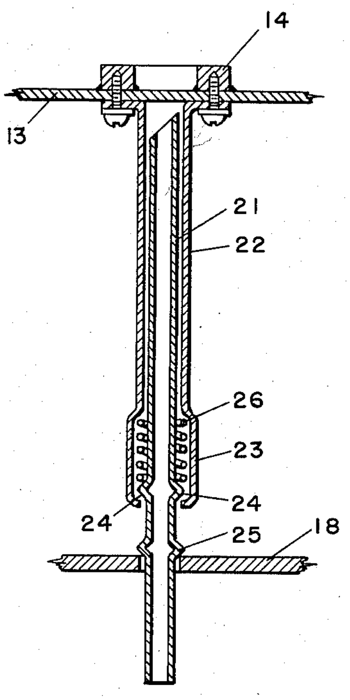

In the accompanying drawings, Fig. 1 is a side elevational view, partly in section, of a deferred action battery embodying the present invention; and Fig. 2 is a cross-sectional view illustrating a modification of the embodiment shown in Fig. 1.

Referring now to the drawings and with particular reference to Fig. 1, there is here illustrated a deferred action battery assembly comprising a casing 10 of cylindrical form which is part of the housing for a Sonobuoy device. Electrodes 11 are shown surrounded by cotton batting 12 and contained within a chamber 13 which is evacuated. An annular level control 14 formed, for example of brass, is sealed (for example, soldered) to the bottom end of the chamber 13, as shown. A resilient bellows 15 formed, for example of beryllium copper, is sealed (for example, soldered) to a pointed tube 16. The bellows 15 is connected to the chamber 13 with screws 17 inserted into the level control 14 as shown. A metallic trigger plate 18, having extensions **18*a* through slots 19, is vertically movable relative to the housing 10. The plate 18 has a hole 20 at its center to permit the tube 16 to extend therethrough. The tube 16 has flanged portions 16*a* extending beyond the limits of the hole 20. In the drawing the electrolyte is indicated at 27**.

In Fig. 2 another tubular connecting means 21 is surrounded by a concentric tube 22. The tube 22 has an enlarged portion 23 which is turned inwardly at one end as shown. The tube 21 has a flanged portion 24 which limits the motion of the tube 21 with respect to the tube 22 in one direction. The tube 21 also has a flanged portion 25 which limits the motion of the tube 21 relative to the tube 22 in the opposite direction. A spring 26, surrounding the tube 21 and contained within the enlarged portion 23 of the tube 22, prevents the chamber 13 from being pierced upon the application of less than a predetermined degree of pressure. The spring 26 also functions to restore the tube 21 to its original position after actuation of the device to restrict fluid flow through the bottom end, as shown, of the tube 21.

When the Sonobuoy device is dropped, for example, into an ocean body it is so balanced that the trigger plate 18 contacts the water first and is forced upwardly which in turn causes the tube 16 to pierce the chamber 13 and permit the flow of an electrolyte such as saltwater therein. The bellows 15 (Fig. 1) restricts the flow of fluid through the other end of the tube 16, preventing air from flowing into the chamber in place of the electrolyte. The spring 26, Fig. 2, restores the tube 21 to its original position in contact with the tube 22 and accomplishes a similar result.

After sufficient electrolyte flows into the chamber a current flows between the electrodes (assuming, of course, that the electrodes are connected to a suitable load). Since the electrolyte is a good conductor, cells in common connection would discharge each other if permitted to remain immersed therein. However, electro-chemical action within the battery generates gas pressure sufficient to force the water out of the same tube through which it entered. The level control 14 maintains a reservoir of electrolyte in contact with the cotton batting 12. The batting retains sufficient moisture to provide, for example, three or four hours of operation. The use of a substantially inert gas producing substance, such as baking soda, may be added to obtain additional gas pressure.

Actual tests of the battery of the present invention have established that it provides an hermetically sealed sea-actuated battery which is characterized by exceedingly quick activation, has a long shelf life and has a relatively long active life.

While there has been hereinbefore described what are at present considered preferred embodiments of the invention, it will be apparent that many and various changes and modifications may be made with respect to the embodiment illustrated, without departing from the spirit of the invention. It will be understood, therefore, that all those changes and modifications as fall fairly within the scope of the present invention, as defined in the appended claims, are to be considered as a part of the present invention.

What is claimed is:

1. A deferred action battery, comprising: an evacuated chamber; a plurality of electrodes disposed in said chamber and adapted to generate current in the presence of an electrolyte and to produce gas under pressure by electrolysis; a tubular connecting means movably mounted below and perpendicular to the bottom of said chamber and having a tapered end adjacent said chamber; a resilient bellows affixed to the bottom of said chamber and surrounding the tapered end of said tubular means to seal off said tapered end to restrict said electrolyte to flow only through said tube; and a flange coupled to the end of said means remote from said chamber for causing said tapered end to pierce the bottom of said chamber upon impact of said assembly with a source of electrolyte and for causing said electrolyte to flow through said tubular means into said chamber, said electrolyte being exhausted through said tube under the pressure of said electrolytic gas.

2. A deferred action battery, comprising: an evacuated chamber; a plurality of electrodes disposed in said chamber and adapted to generate current in the presence of an electrolyte; a tubular connecting means, said tubular connecting means being adapted to pierce said chamber and movably mounted with respect to the bottom of said chamber and having a tapered end adjacent said chamber; supporting means affixed to the bottom surface of said chamber and surrounding said tapered end of said tubular means to restrict said electrolyte to flow only through said tubular means; and a flange coupled to the ends of said tubular means remote from said chamber for causing said tapered end to pierce said chamber upon impact of said assembly with a source of electrolyte and causing said electrolyte to flow through said tubular means into said chamber.

3. A deferred action battery, comprising: an evacuated chamber; a plurality of electrodes disposed in said chamber and adapted to generate current in the presence of an electrolyte; a tubular connecting means, said tubular connecting means being adapted to pierce said chamber and movably mounted with respect to the bottom of said chamber and having a tapered end adjacent said chamber; supporting means affixed to the bottom surface of said chamber and surrounding said tapered end of said tubular means to restrict said electrolyte to flow only through said tubular means; a flange coupled to the end of said tubular means remote from said chamber for causing said tapered end to pierce said chamber upon impact of said assembly with a source of electrolyte and for causing said electrolyte to flow through said tubular means into said chamber; and resilient means connecting said tubular means and said chamber to restore said tubular means to its original position.

4. A deferred action battery, comprising: an evacuated chamber; a plurality of electrodes disposed in said chamber and adapted to generate current in the presence of an electrolyte; a tubular connecting means, said tubular connecting means being adapted to pierce said chamber and movably mounted with respect to the bottom of said chamber and having a tapered end adjacent said chamber; a resilient bellows affixed to the bottom surface of said chamber and enclosing said tapered end of said tubular means to restrict said electrolyte to flow only through said tubular means; and a flange coupled to the end of said tubular means remote from said chamber for causing said tapered end to pierce said chamber upon impact of said assembly with a source of electrolyte and for causing said electrolyte to flow through said tubular means into said chamber, said bellows restoring said tubular means to its original position after said impact.

5. A deferred action battery, comprising: an evacuated chamber; a plurality of electrodes disposed in said chamber and adapted to generate current in the presence of an electrolyte; a first tubular connecting means, said tubular connecting means being adapted to pierce said chamber and movably mounted with respect to the bottom surface of said chamber and having a tapered end adjacent said chamber; a flange coupled to the end of said tubular means remote from said chamber for causing said tapered end to pierce said chamber upon impact of said assembly with a source of electrolyte and for causing said electrolyte to flow through said tubular means into said chamber; a second tubular connecting means concentrically surrounding and connecting said first tubular means to said chamber; and resilient means so connecting said first and second tubular means as to prevent the flow of fluid into said chamber other than through said first tubular means and to enable exhausting of the excess electrolyte through said first tubular means after said battery is activated.

6. A deferred action battery, comprising: an evacuated chamber; a plurality of electrodes disposed in said chamber and adapted to generate current in the presence of an electrolyte; a tubular connecting means, said tubular connecting means being adapted to pierce said chamber and movably mounted with respect to the bottom of said chamber and having a tapered end adjacent said chamber; supporting means affixed to the bottom surface of said chamber and surrounding said tapered end of said tubular means to restrict said electrolyte to flow only through said tube; a flange coupled to the end of said tubular means remote from said chamber for causing said tapered end to pierce said chamber upon impact of said assembly with a source of electrolyte and for causing said electrolyte to flow through said tubular means into said chamber; and means disposed within said chamber for maintaining a minimum level of electrolyte after the electrolyte has been discharged through said tubular means due to the gas pressure produced by electrolytic action.

References Cited in the file of this patent

UNITED STATES PATENTS

| | | |
|---|---|---|
| 1,310,586 | Straub et al. | July 22, 1919 |
| 2,177,235 | Winckler | Oct. 24, 1939 |
| 2,594,879 | Davis | Apr. 29, 1952 |